United States Patent
Miki

(10) Patent No.: US 12,538,597 B2
(45) Date of Patent: Jan. 27, 2026

(54) PHOTOELECTRIC CONVERSION APPARATUS AND SYSTEM

(71) Applicant: CANON KABUSHIKI KAISHA, Tokyo (JP)

(72) Inventor: Takafumi Miki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 411 days.

(21) Appl. No.: 18/347,115

(22) Filed: Jul. 5, 2023

(65) Prior Publication Data

US 2024/0014228 A1 Jan. 11, 2024

(30) Foreign Application Priority Data

Jul. 6, 2022 (JP) ................................ 2022-108802

(51) Int. Cl.
*H10F 39/00* (2025.01)
*H04N 25/766* (2023.01)
*H04N 25/767* (2023.01)

(52) U.S. Cl.
CPC ....... *H10F 39/8033* (2025.01); *H04N 25/766* (2023.01); *H04N 25/767* (2023.01); *H10F 39/8027* (2025.01); *H10F 39/8037* (2025.01); *H10F 39/811* (2025.01); *H10F 39/813* (2025.01)

(58) Field of Classification Search
CPC ............ H10F 39/8033; H10F 39/8027; H10F 39/8037; H10F 39/811; H10F 39/813; H04N 25/766; H04N 25/767; H04N 25/617; H04N 25/771
See application file for complete search history.

(56) References Cited

U.S. PATENT DOCUMENTS

| | | | |
|---|---|---|---|
| 10,249,670 B2 | 4/2019 | Seko |
| 10,535,688 B2 | 1/2020 | Onuki et al. |
| 10,658,404 B2 | 5/2020 | Abe et al. |
| 10,764,520 B2 | 9/2020 | Onuki et al. |
| 10,848,695 B2 | 11/2020 | Miki et al. |
| 11,056,520 B2 | 7/2021 | Onuki et al. |

(Continued)

FOREIGN PATENT DOCUMENTS

| | | |
|---|---|---|
| JP | 2015-138862 A | 7/2015 |
| JP | 2015-185823 A | 10/2015 |
| JP | 2022-013260 A | 1/2022 |

*Primary Examiner* — Tony Ko
(74) *Attorney, Agent, or Firm* — Venable LLP

(57) ABSTRACT

A photoelectric conversion apparatus includes a semiconductor layer in which pixels are arranged in a matrix, the pixels each including a photoelectric conversion portion and a transistor used for loading a signal from the photoelectric conversion portion, and multilayer wiring formed on the semiconductor layer and including a first wiring layer, a first inter-layer insulating layer, a second wiring layer, a second inter-layer insulating layer, and a third wiring layer in this order. The multilayer wiring includes a plurality of output lines for loading signals from the pixels. The output lines each include first wiring provided in the first wiring layer, second wiring provided in the second wiring layer, and a connecting portion penetrating the first inter-layer insulating layer to interconnect the first wiring and the second wiring. A thickness of the first inter-layer insulating layer is smaller than a thickness of the second inter-layer insulating layer.

14 Claims, 11 Drawing Sheets

(56) References Cited

U.S. PATENT DOCUMENTS

| | | | |
|---|---|---|---|
| 2017/0125464 A1* | 5/2017 | Abe | H10F 39/811 |
| 2019/0043913 A1* | 2/2019 | Juen | H10F 39/8037 |
| 2020/0213541 A1* | 7/2020 | Kobayashi | H10F 39/811 |

* cited by examiner

PHOTOELECTRIC CONVERSION APPARATUS AND SYSTEM

BACKGROUND OF THE INVENTION

Field of the Invention

The present invention relates to a photoelectric conversion apparatus.

Description of the Related Art

In recent years, a complementary metal oxide semiconductor: CMOS image sensor is widely used for an image pickup apparatus such as a digital still camera or a digital camcorder. To meet the demand for increase in the number of pixels, increase in the loading speed, and the like, improvement of the wiring structure is proposed.

Japanese Patent Laid-Open No. 2015-185823 discloses providing a plurality of pixel output lines for each column of pixels, and disposing adjacent pixel output lines in different wiring layers.

Japanese Patent Laid-Open No. 2015-138862 discloses a laminated photoelectric conversion apparatus including a pixel chip and a logic chip. This document discloses disposing wiring other than vertical signal lines in higher layers than the vertical signal lines in the pixel chip to suppress crosstalk interference from the logic chip to the pixel chip.

Japanese Patent Laid-Open No. 2022-13260 discloses, to reduce resistance of wiring interconnecting transfer transistor gates of a plurality of pixels, constituting each wiring interconnecting the transfer transistor gates by two wiring layers of an upper layer and a lower layer, and interconnecting the upper and lower wiring layers by backing vias.

Since the number of pixels from which loading can be performed simultaneously can be increased by providing a plurality of pixel output lines for each column of the pixels as disclosed in Japanese Patent Laid-Open No. 2015-185823, it can be expected to achieve increase in the image loading speed. In addition, in Japanese Patent Laid-Open No. 2015-185823, since adjacent pixel output lines are disposed in different wiring layers, there is a possibility that increase in the array pitch of the pixels can be suppressed, and an image pickup apparatus of a large pixel number can be realized.

However, in the case where a plurality of pixel output lines are provided for each column of the pixels and adjacent pixel output lines are disposed in different wiring layers, there is a problem that electrical crosstalk is more likely to occur between image output lines.

The technique disclosed in Japanese Patent Laid-Open No. 2015-138862 is effective for suppressing the crosstalk interference from the logic chip to the pixel chip, but does not suppress the crosstalk occurring between the pixel output lines.

The technique disclosed in Japanese Patent Laid-Open No. 2022-13260 is a method for reducing the resistance of the wiring interconnecting transfer transistor gates of a plurality of pixels, and is not a technique that suppresses the crosstalk occurring between the pixel output lines.

Therefore, in a photoelectric conversion apparatus in which a plurality of pixel output lines are provided for each column of the pixels and the plurality of pixel output lines are constituted by a plurality of wiring layers, there has been a demand for a technique capable of suppressing electrical crosstalk occurring between pixel output lines.

SUMMARY OF THE INVENTION

According to a first aspect of the present invention, a photoelectric conversion apparatus includes a semiconductor layer in which pixels are arranged in a matrix, the pixels each including a photoelectric conversion portion and a transistor used for loading a signal from the photoelectric conversion portion, and multilayer wiring formed on the semiconductor layer and including a first wiring layer, a first inter-layer insulating layer, a second wiring layer, a second inter-layer insulating layer, and a third wiring layer in this order. The multilayer wiring includes a plurality of output lines for loading signals from the pixels. The pixels are each connected to corresponding one of the plurality of output lines. Each column of the matrix of the pixels is provided with two or more of the plurality of output lines. The output lines each include first wiring provided in the first wiring layer, second wiring provided in the second wiring layer, and a connecting portion penetrating the first inter-layer insulating layer to interconnect the first wiring and the second wiring. A thickness of the first inter-layer insulating layer is smaller than a thickness of the second inter-layer insulating layer.

According to a second aspect of the present invention, a photoelectric conversion apparatus includes a semiconductor layer in which pixels are arranged in a matrix, the pixels each including a photoelectric conversion portion and a transistor used for loading a signal from the photoelectric conversion portion, and multilayer wiring formed on the semiconductor layer and including a first wiring layer, a first inter-layer insulating layer, a second wiring layer, a second inter-layer insulating layer, and a third wiring layer in this order. The multilayer wiring includes a plurality of output lines for loading signals from the pixels and a plurality of control lines for driving the transistors of the pixels. The pixels are each connected to corresponding one of the plurality of output lines. Each column of the matrix of the pixels is provided with two or more of the plurality of output lines. Each row of the matrix of the pixels is provided with one or more of the plurality of control lines. The output lines each include first wiring provided in the first wiring layer, second wiring provided in the second wiring layer, and a connecting portion penetrating the first inter-layer insulating layer to interconnect the first wiring and the second wiring. A thickness of the first wiring and/or a thickness of the second wiring is smaller than a thickness of the control lines.

According to a third aspect of the present invention, a photoelectric conversion apparatus includes a semiconductor layer in which pixels are arranged in a matrix, the pixels each including a photoelectric conversion portion and a transistor used for loading a signal from the photoelectric conversion portion, and multilayer wiring formed on the semiconductor layer and including a first wiring layer, a first inter-layer insulating layer, a second wiring layer, a second inter-layer insulating layer, and a third wiring layer in this order. The multilayer wiring includes a plurality of output lines for loading signals from the pixels. The pixels are each connected to corresponding one of the plurality of output lines. Each column of the matrix of the pixels is provided with two or more of the plurality of output lines. The output lines each include first wiring provided in the first wiring layer, second wiring provided in the second wiring layer, and a connecting portion penetrating the first inter-layer insulating layer to interconnect the first wiring and the second wiring. A dielectric constant of the first inter-layer insulating layer is smaller than a dielectric constant of the second inter-layer insulating layer.

Further features of the present invention will become apparent from the following description of exemplary embodiments with reference to the attached drawings.

DESCRIPTION OF THE EMBODIMENTS

Figure 1:
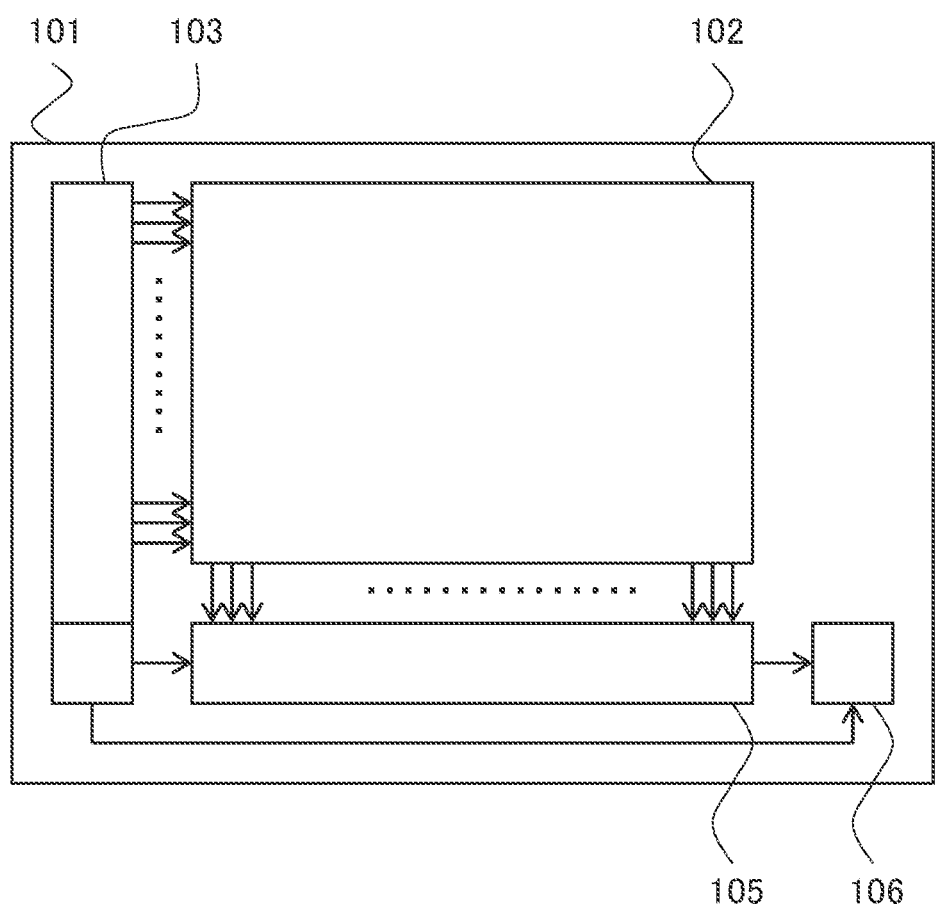
FIG. 1 is a schematic block diagram of a photoelectric conversion apparatus according to an embodiment.

A photoelectric conversion apparatus serving as an embodiment of the present invention will be described with reference to drawings.

To be noted, embodiments described below are merely examples, and for example, details of the configurations thereof can be appropriately modified for implementation by one skilled in the art, without departing from the gist of the present invention.

To be noted, in the drawings referred to in the description of the following embodiments, elements denoted by the same reference numerals have substantially the same functions unless otherwise described.

In addition, the drawings may be schematically expressed for the sake of convenience of illustration and description, and therefore do not always strictly match the actual shapes, sizes, layouts, and the like. In the case where a plurality of the same elements are arranged in the drawings, the reference signs and description thereof may be omitted. To be noted, in the case of describing the arrangement of pixels with reference to the drawings, "row" refers to arrangement in the horizontal direction in the drawings, and "column" refers to arrangement in the vertical direction in the drawings.

First Embodiment

FIG. 1 is a schematic block diagram of a photoelectric conversion apparatus according to the present embodiment. A photoelectric conversion apparatus 101 includes, on a semiconductor layer (for example, a silicon substrate), a pixel region 102 in which a plurality of pixels each including a photoelectric conversion element are two-dimensionally arranged, and a peripheral circuit portion. The peripheral circuit portion includes a vertical scanning circuit 103 for driving the pixels, a horizontal scanning circuit 105 for loading electric signals from the pixels, and an output portion 106 for outputting the electric signals loaded from the pixels to the outside. Multilayer wiring is formed on the semiconductor layer, and the multilayer wiring includes output lines and control lines that are connected to the pixels. The multilayer wiring has a layer structure in which a first wiring layer, a first inter-layer insulating layer, a second wiring layer, a second inter-layer insulating layer, and a third wiring layer are laminated in this order from top to bottom.

Figure 2:
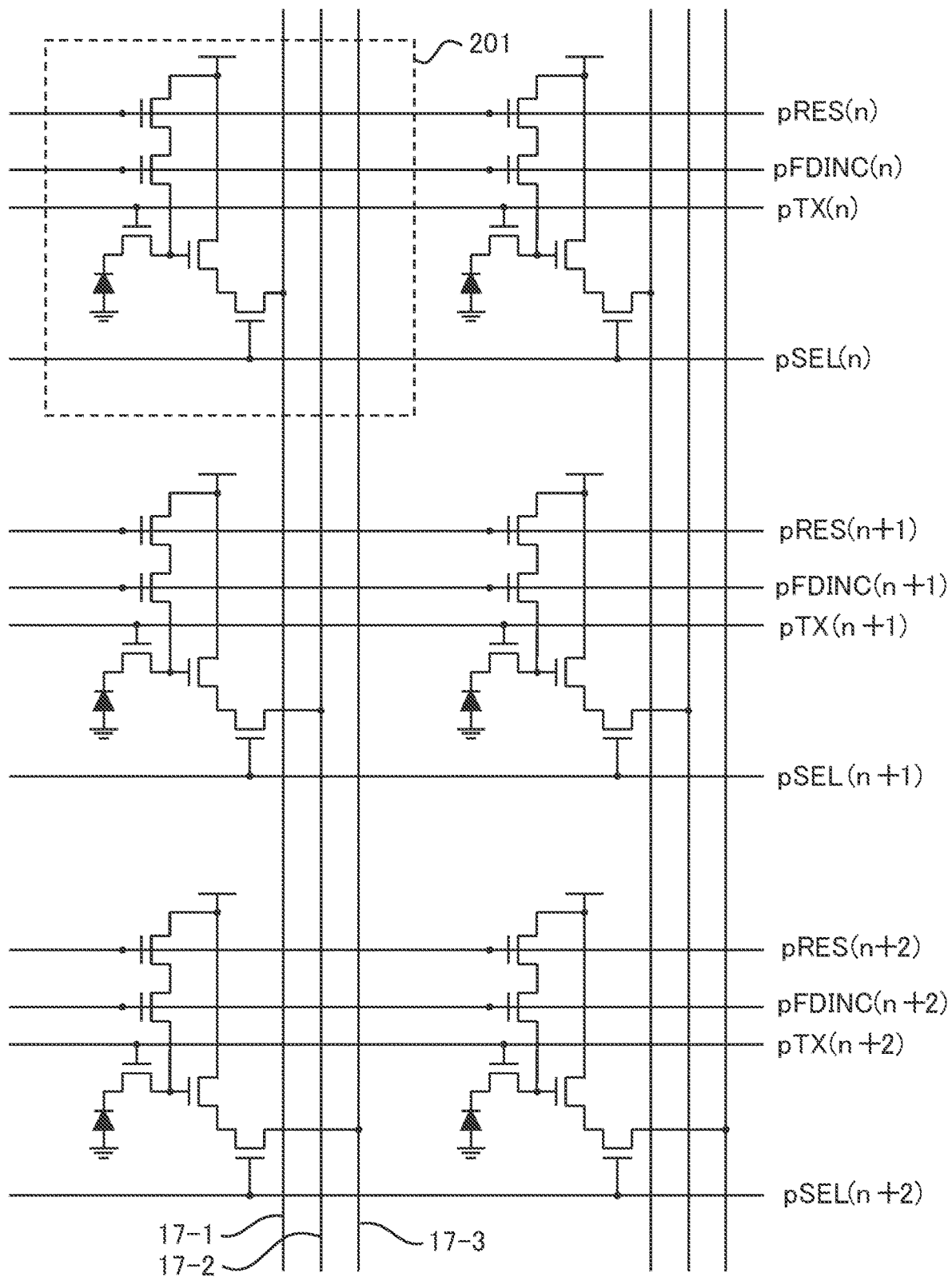
FIG. 2 is an equivalent circuit diagram of part of a pixel region.

FIG. 2 is an equivalent circuit diagram illustrating a circuit configuration by extracting a part of the pixel region 102. For the sake of convenience of illustration, in FIG. 2, pixels of three rows and two columns are illustrated with wiring among the pixel region 102 in which a large number of pixels 201 are arranged in a two-dimensional matrix. In the example of FIG. 2, three output lines 17-1, 17-2, and 17-3 are provided for each column of the pixels arranged in a matrix. To be noted, the number of the output lines is not limited to this as long as a plurality of output lines are provided for each column of the pixels. The internal circuit configuration of each pixel is substantially the same, but each pixel is connected to an appropriate control signal line and output line in accordance with the placement in the two-dimensional arrangement. For example, pixels disposed in the same row are connected to the same control signal line extending in the row direction. At the end of the reference sign of each control signal line in FIG. 2, (n) indicating the n-th row, (n+1) indicating the (n+1)-th row, or (n+2) indicating the (n+2)-th row is added. To be noted, for the sake of convenience of description, reference signs such as pSEL, pRES, pFDINC, and pTX may indicate a control signal line or a control signal transmitted through the control signal line.

Each pixel is connected to one of the output lines 17-1, 17-2, and 17-3 in accordance with the position thereof. To be noted, although not illustrated in the equivalent circuit diagram of FIG. 2, colored light to be photoelectrically converted can be set for each pixel by providing the photoelectrical conversion portion of each pixel with a color filter. As a method for arranging the color filter, for example, the Bayer arrangement is preferable, but other arrangement methods may be employed. For example, the output lines may be configured such that the output line 17-1 is used for loading from red pixels, the output line 17-2 is used for loading from green pixels, and the output line 17-3 is used for loading from blue pixels.

Figure 3:
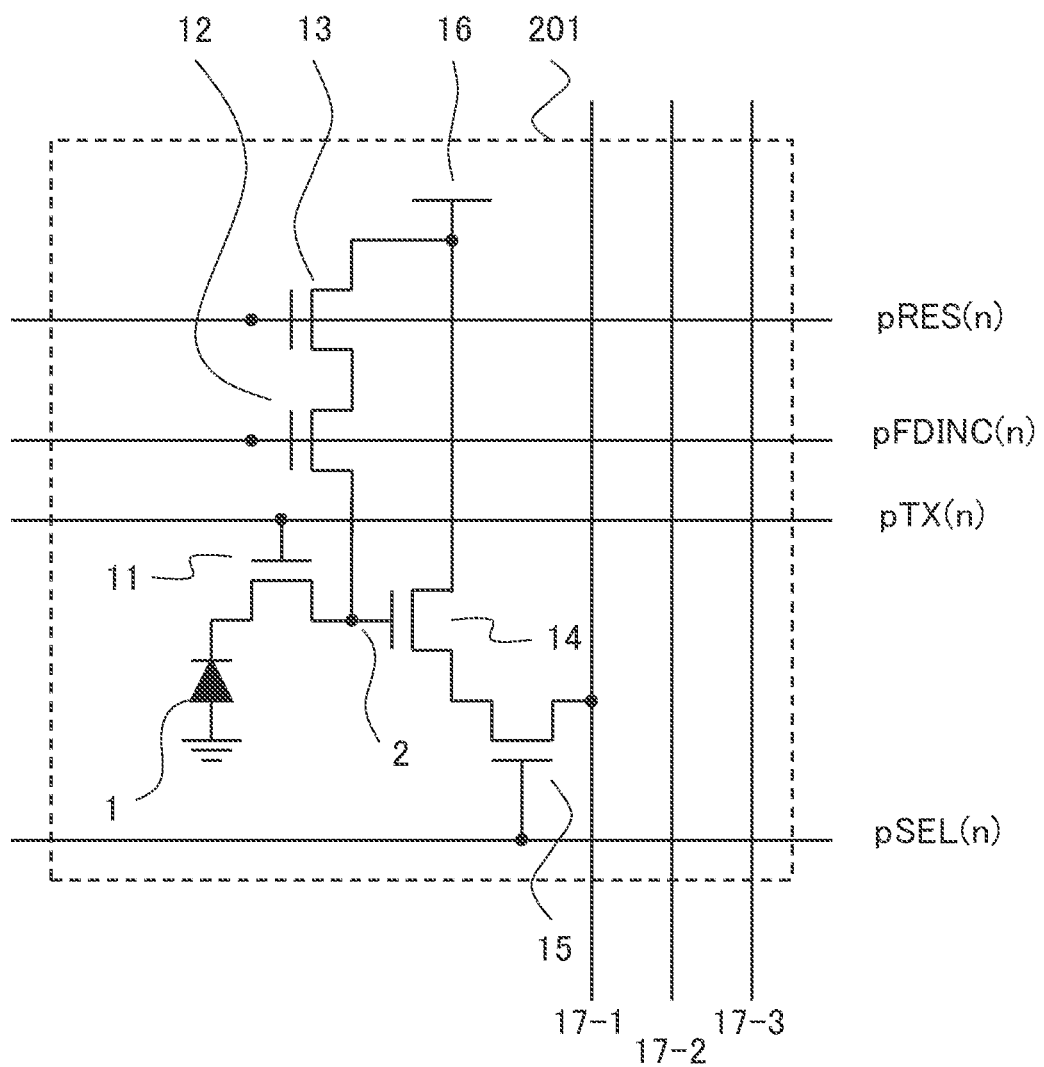
FIG. 3 is an equivalent circuit diagram of a unit pixel that is one pixel illustrated in an upper-left portion of FIG. 2.

FIG. 3 is an equivalent circuit diagram of a unit pixel that is one pixel (pixel 201) extracted from the upper-left portion of FIG. 2. The pixel 201 includes a photoelectric conversion portion 1, a floating diffusion portion 2, a transfer portion 11, a capacitance switching portion 12, a reset portion 13, an amplification portion 14, and a row selection portion 15, and is connected to a power source 16. For example, the pixel 201 is formed on a semiconductor layer such as a silicon substrate.

The photoelectric conversion portion 1 is constituted by a photoelectric conversion element such as a photodiode, but may be constituted by any way as long as the photoelectric conversion portion 1 is an element capable of photoelectric conversion. The photoelectric conversion portion 1 generates a signal charge corresponding to the light reception amount.

The transfer portion 11 is a switch (transistor) capable of switching on/off of conduction between the photoelectric conversion portion 1 and the floating diffusion portion 2, and is turned on when, for example, transferring a signal charge generated in the photoelectric conversion portion 1 to the floating diffusion portion 2. The transfer portion 11 is driven by a transfer portion driving pulse pTX(n).

The floating diffusion portion 2 temporarily holds the signal charge transferred from the photoelectric conversion portion 1 via the transfer portion 11, and at the same time, functions as a charge-voltage conversion portion that converts the held signal charge into a voltage signal.

The reset portion 13 and the capacitance switching portion 12 are switches (transistors) that are respectively turned on/off by a reset portion driving pulse pRES(n) and a floating diffusion capacitance switching pulse pFDINC(n) that are each a control signal. For example, when resetting the charge of the floating diffusion portion 2, the reset portion 13 and the capacitance switching portion 12 are simultaneously turned on, and the floating diffusion portion 2 and the power source 16 are connected. In addition, by turning on the capacitance switching portion 12 in a state in which the reset portion 13 is off, an amount corresponding to the gate capacitance of the capacitance switching portion 12 can be added to the accumulation capacitance of the floating diffusion portion 2.

The amplification portion 14 amplifies the voltage signal obtained by the conversion by the floating diffusion portion 2, and outputs the amplified signal as a pixel signal.

The row selection portion 15 is an on/off switch (transistor) driven by a row selection driving pulse pSEL(n), and outputs the pixel signal amplified by the amplification portion 14 to one of the output lines 17-1, 17-2, and 17-3. In the pixel 201 exemplified in FIG. 3, the row selection portion 15 is connected to the output line 17-1 among the three output lines, and therefore the pixel signal is output to the output line 17-1. To be noted, as a result of including the row selection portion 15, row-basis selective loading from the pixel matrix can be performed, but the row selection portion 15 may be omitted in the case where this is not necessary.

Figure 4:
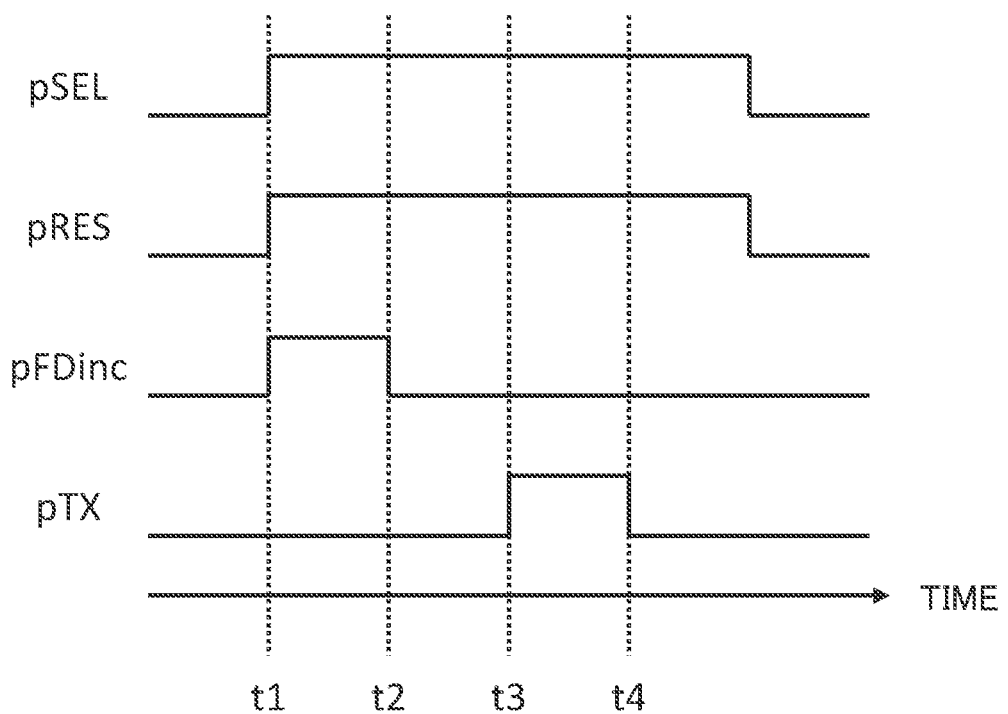
FIG. 4 is a timing chart for describing a pixel driving method.

Next, the driving method of the pixels will be described with reference to FIG. 4. FIG. 4 illustrates a timing chart from reset to output of the pixel signal in the case of low luminance (small light reception amount) as an example. The horizontal axis represents the time, and the vertical axis represents the voltage level (on/off) of each control signal. From top to bottom of FIG. 4, graphs of respective control signals of the row selection driving pulse pSEL, the reset portion driving pulse pRES, the floating diffusion capacitance switching pulse pFDINC, and the transfer portion driving pulse pTX are sequentially illustrated.

First, at a time t1, the capacitance switching portion 12, the reset portion 13, and the row selection portion 15 are turned on. As a result of this, the pixel is selected, and the charge in the floating diffusion portion 2 is reset. The photoelectric conversion portion 1 accumulates the signal charge while generating the signal charge.

Next, at a time t2, the capacitance switching portion 12 is turned off. As a result of this, the capacitance of the floating diffusion portion 2 is reduced in the case of low luminance, and thus the noise at the time of loading the signal can be reduced. A reset level signal for a CDS (correlated double sampling) is output to the output line 17 via the amplification portion 14 and the row selection portion 15. The photoelectric conversion portion 1 accumulates the signal charge while generating the signal charge.

Next, at a time t3, the transfer portion 11 is turned on, the signal charge accumulated in the photoelectric conversion portion 1 is transferred to the floating diffusion portion 2.

Then, at a time t4, the transfer portion 11 is turned off, and the transfer of the signal charge to the floating diffusion portion 2 is finished. The amplification portion 14 amplifies the voltage level of the floating diffusion portion 2, and the amplified voltage signal is output to the output line as a pixel signal via the row selection portion 15.

Next, the configuration of the output lines and the control signal lines in the first embodiment will be described.

Figure 5:
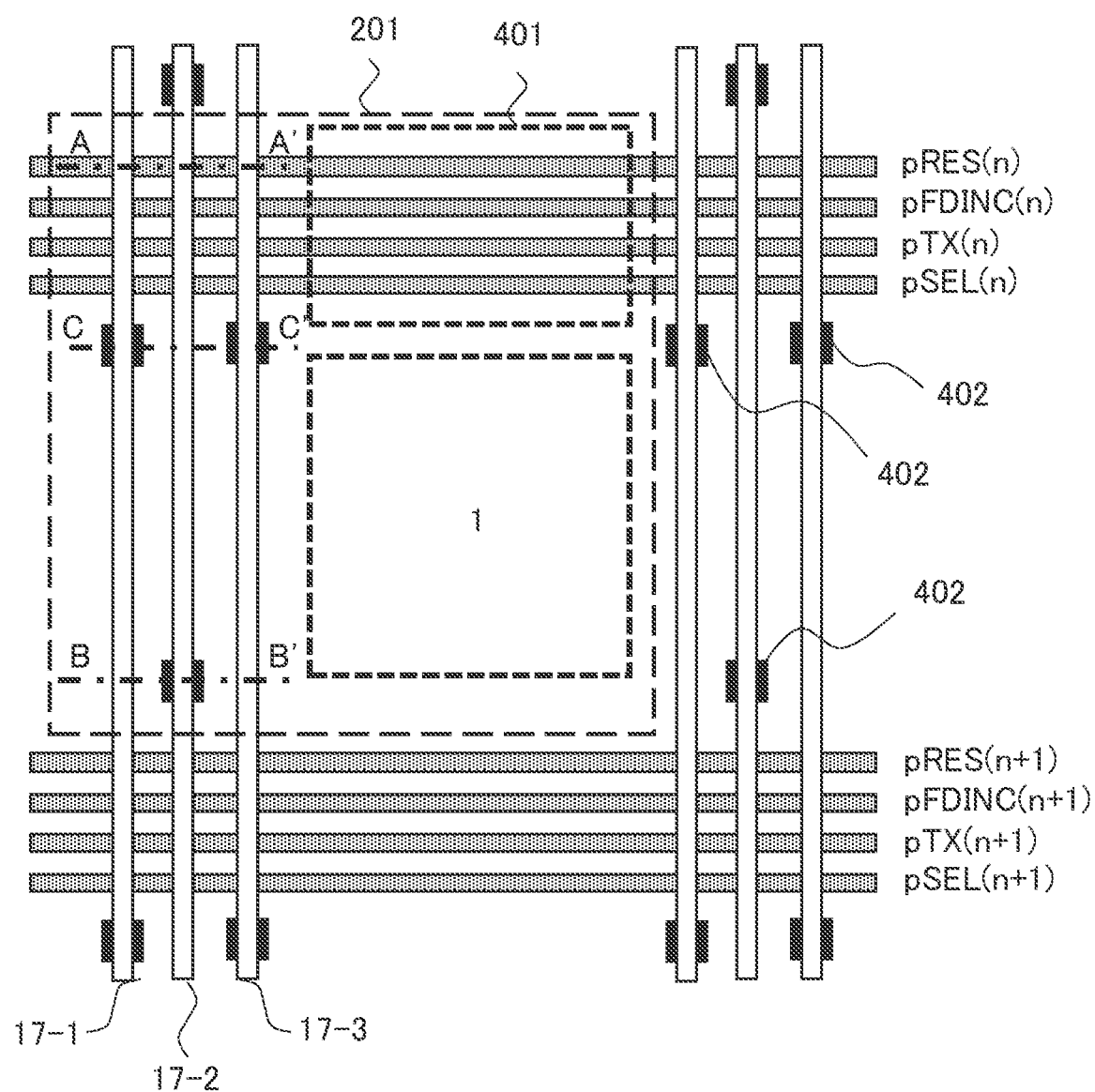
FIG. 5 is a schematic plan view for describing a configuration of a pixel.

FIG. 5 is a schematic plan view for describing the configuration of the pixel 201. In this drawing, for the sake of convenience of illustration, regions where elements such as the photoelectric conversion portion 1 and the transistor are provided are indicated by rectangles, but this does not necessarily mean that the shapes of the elements are rectangular, and this merely indicates that the elements are disposed in these regions. For example, a photodiode is disposed in the photoelectric conversion portion 1, and the reset portion 13, the amplification portion 14, the row selection portion 15, and the like are disposed in a pixel transistor region 401.

Although it is not explicitly indicated in FIG. 5, which is a plan view, the output lines (in this example, the output lines 17-1, 17-2, and 17-3 provided for each pixel column) are each constituted by a plurality of wiring layers arranged in the up-down direction with an inter-layer insulating layer therebetween. The wiring layers arranged in the up-down direction are interconnected via a connecting portion 402 (for example, a connecting via). That is, each output line is configured as backed wiring. The connecting portions 402 are preferably arranged in a dispersed manner at predetermined intervals (for example, at a pixel pitch in the column direction) in plan view. By employing such a configuration, the resistance of the output lines can be reduced, and also in the case of occurrence of breakage in any of the wiring layers, the pixel signal can be output to the horizontal scanning circuit 105 from the pixel 201.

Figure 6A:
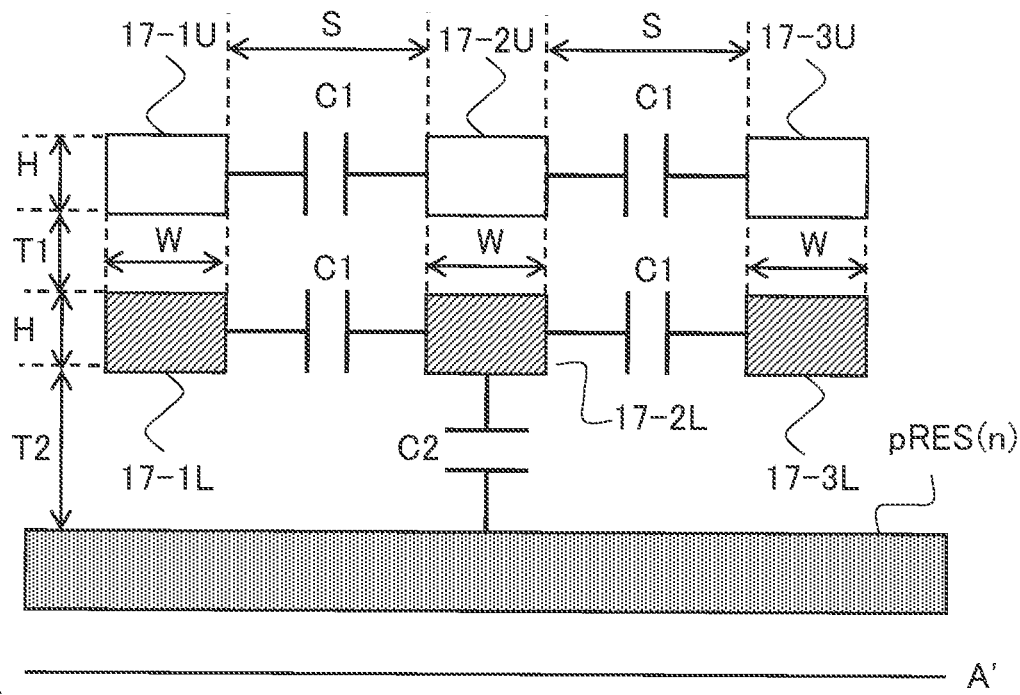
FIG. 6A is a schematic section view of a portion indicated by a line A-A' of FIG. 5 in a first embodiment.

FIG. 6A is a schematic section view of a portion indicated by a line A-A' in FIG. 5, that is, a schematic section view of a portion where the control signal line pRES(n) that transmits the reset portion driving pulse and the output lines 17-1, 17-2, and 17-3 intersect. To be noted, portions where the other control lines connected to the pixel and the output lines 17-1, 17-2, and 17-3 intersect also have sectional structures similar to FIG. 6A. The other control lines are, for example, the control signal line pFDINC that transmits the floating diffusion capacitance switching pulse, the control signal line pTX that transmits the transfer portion driving pulse, and the control signal line pSEL that transmits the row selection driving pulse.

The output line 17-1 illustrated in FIG. 5 is constituted by two layers of upper wiring 17-1U and lower wiring 17-1L illustrated in FIG. 6A. Similarly, the output line 17-2 illustrated in FIG. 5 is constituted by two layers of upper wiring 17-2U and lower wiring 17-2L illustrated in FIG. 6A, and the output line 17-3 illustrated in FIG. 5 is constituted by two layers of upper wiring 17-3U and lower wiring 17-3L illustrated in FIG. 6A. The upper wiring of the output lines and the lower wiring of the output lines are respectively formed in the same wiring layers. The upper wiring of the output lines is formed in a first wiring layer, and the lower wiring of the output lines is formed in a second wiring layer. To be noted, although an example in which the output lines are constituted by two layers of upper and lower wiring is described herein, the number of layers of wiring constituting the output lines is not limited to this, and may be, for example, three or more.

To reduce the crosstalk, it is preferable that the upper wiring (first wiring) and the lower wiring (second wiring) of each output line have substantially the same width in plan view, and are disposed to be laminated in the up-down direction such that the outer edges thereof substantially overlap, and the section view of FIG. 6A illustrates an example of this case. However, the upper wiring and the lower wiring of each output line do not necessarily have to have the same width in plan view. In addition, how the upper wiring (first wiring) and the lower wiring (second wiring) overlap in plan view may be a mode in which one is included in the range of the other, or may be a mode in which only part of each other overlap. It suffices as long as the via (connecting portion) interconnecting the upper wiring (first wiring) and the lower wiring (second wiring) is provided in the overlapping portion. To be noted, the "plan view" in the description above may be also referred to as a view in a case of viewing through in a direction orthogonal to the main surface of the semiconductor layer. In addition, "substantially" in "substantially the same" and "substantially overlap" has a meaning of "except for inevitable factors such as a production error".

In the illustrated example, the upper wiring and the lower wiring of each output line have a width of W and a height (thickness) of H. The output lines are arranged in a distance S from each other in the row direction. A first inter-layer insulating layer having a thickness of T1 is disposed between the upper wiring and the lower wiring of each output line. The control signal line pRES(n) that transmits the reset portion driving pulse is disposed along the row direction under the lower wiring of each output line with a second inter-layer insulating layer having a thickness of T2 therebetween.

Here, the parasitic capacitance of the output line 17-2 is considered. In the case where the parasitic capacitance between adjacent output lines in the same layer is C1 and the parasitic capacitance between the output line 17-2 and the control signal line pRES(n) is C2, the parasitic capacitance Ca of the output line 17-2 is Ca=4×C1+C2. Here, in the case where the parasitic capacitance C2 is regarded as a parallel flat-plate capacitor having a width of W and a thickness of T2, C2 can be reduced by increasing T2. Also, regarding the parasitic capacitance between the output line 17-1 and the control signal line pRES(n) and the parasitic capacitance between the output line 17-3 and the control signal line pRES(n), the capacitance can be reduced by increasing T2.

To be noted, similar matter applies to portions where other control lines and output lines intersect in plan view. In addition, although the control line is disposed under the output lines in this example, a case where the control line is disposed above the output lines can be considered in a similar manner.

Figure 6B:
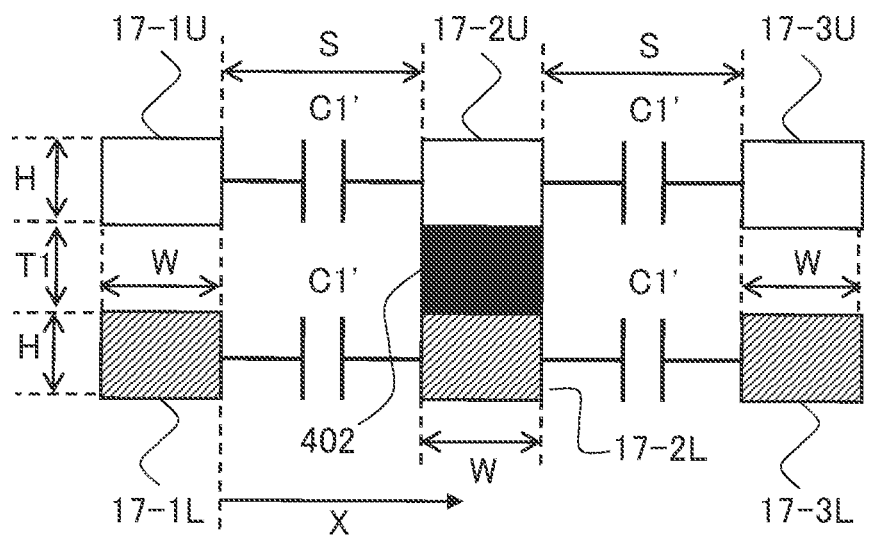
FIG. 6B is a schematic section view of a portion indicated by a line B-B' of FIG. 5 in the first embodiment.

FIG. 6B is a section view of a portion indicated by a line B-B' in FIG. 5, that is, a section view taken by cutting, in the row direction, a portion where the upper wiring 17-2U and the lower wiring 17-2L constituting the output line 17-2 are interconnected by the connecting portion 402 (via).

Here, in the case where the parasitic capacitance between the output line 17-2 connected by the connecting portion 402 (connecting via) and an output line adjacent in the same layer is C1', C1' is expressed by the formula (1). To be noted, c represents the dielectric constant of the inter-layer insulating layer.

Formula (1)

$$C1' = \frac{\varepsilon T_1}{2S \log\left(\frac{T_1 + 2H}{2H}\right)} \quad (1)$$

Here, since C1' monotonically increases in the range of T1>0, C1' can be reduced by reducing the thickness T1 of the first inter-layer insulating layer between the two layers constituting the output lines. The same applies to a case where the output lines are each constituted by three or more layers.

To give auxiliary description, a wiring thickness H(x) is expressed by the formula (2) in a range in which a coordinate X satisfies 0≤X≤S in FIG. 6B.

Formula (2)

$$H(x) = \frac{T_1}{2S}x + H \quad (2)$$

In the case where a minute capacitance per unit length of a thickness Δx is ΔC, ΔC is expressed by the formula (3).

Formula (3)

$$\Delta C = \varepsilon \frac{H(x)}{dx} \quad (3)$$

In the case where it is considered that C1' is a composite capacitance in which minute capacitances ΔC are connected in series, the relationship of the formula (4) is satisfied.

Formula (4)

$$\begin{aligned}
\frac{1}{C1'} &= \int_0^S \frac{1}{\Delta C}dx \quad (4)\\
&= \int_0^S \frac{dx}{\varepsilon H(x)}\\
&= \frac{1}{\varepsilon}\int_0^S \frac{2S}{T_1 x + 2SH}dx\\
&= \frac{2S}{\varepsilon}\left[\frac{\log(T_1 x + 2SH)}{T_1}\right]_{x=0}^{x=S}\\
&= \frac{2S}{\varepsilon T_1}\log\left(\frac{T_1 S + 2SH}{2SH}\right)
\end{aligned}$$

Therefore, C1' is expressed by the formula (1) described above.

Here, how C1' changes with respect to T1 is considered. A differential of C1' with respect to T1 is expressed by the formula (5).

Formula (5)

$$\frac{dC1'}{dT_1} = \frac{\varepsilon}{2S}\frac{\log\left(\frac{T_1 + 2H}{2H}\right) - \frac{T_1}{T_1 + 2H}}{\left\{\log\left(\frac{T_1 + 2H}{2H}\right)\right\}^2} \quad (5)$$

Here, in the case where the denominator of the formula (5) is represented by f(T1) and f(T1) is differentiated with respect to T1, the differential is expressed by the formula (6)

Formula (6)

$$\frac{df(T_1)}{dT_1} = \frac{2H}{T_1 + 2H} \frac{1}{2H} - \frac{T_1 + 2H - T_1}{(T_1 + 2H)^2}$$

$$= \frac{T_1 + 2H - 2H}{(T_1 + 2H)^2}$$

$$= \frac{T_1}{(T_1 + 2H)^2}$$

Since T1>0 holds, the formula (6) is always positive. In addition, since f(0)=0 holds, f(T1) is always positive and monotonically increases in the range of T1>0. Therefore, the formula (5) is always positive in the range of T1>0, and thus C1' monotonically increases in the range of T1>0. That is, C1' can be reduced by reducing T1 as much as possible.

Figure 7:
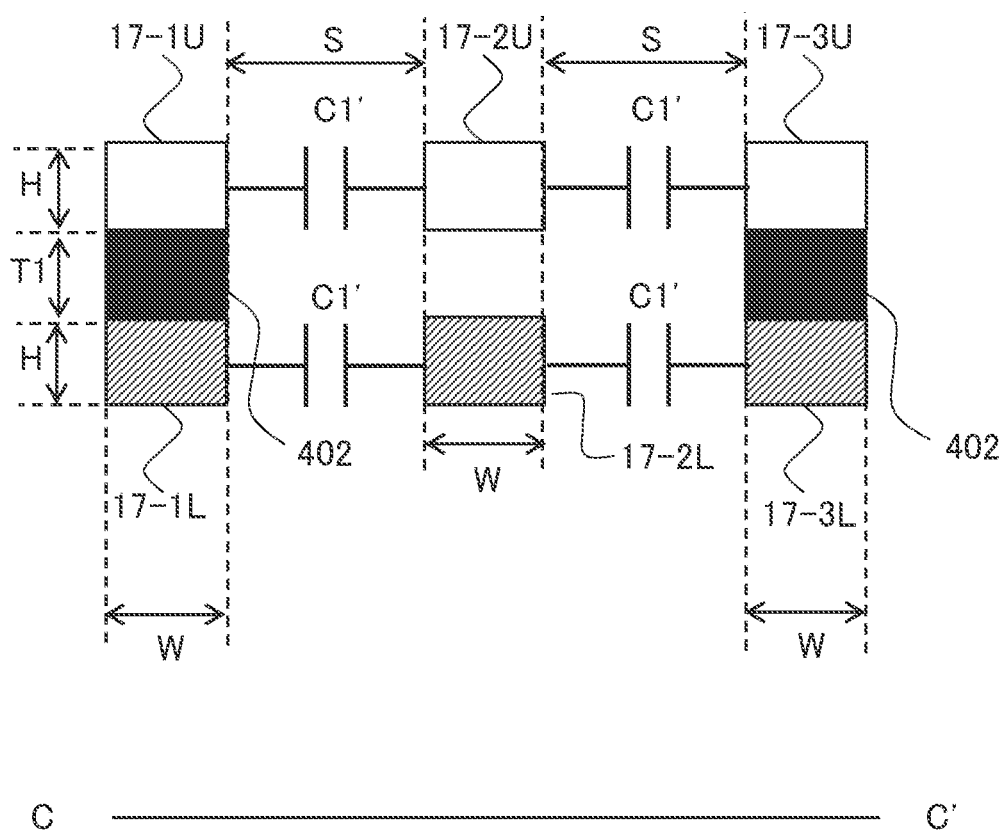
FIG. 7 is a schematic section view of a portion indicated by a line C-C' of FIG. 5 in the first embodiment.

FIG. 7 is a section view of a portion indicated by a line C-C' in FIG. 5, that is, a section view taken by cutting in the row direction, a portion where the upper wiring and lower wiring constituting the output line 17-1 and the upper wiring and lower wiring constituting the output line 17-3 are respectively interconnected by the connecting portions 402 (via) penetrating the first inter-layer insulating layer.

Here, the parasitic capacitance between an output line connected by the connecting portion 402 (connecting via) and an output line adjacent thereto in the same layer is represented by C1' in the formula (1). Therefore, as described above, C1' can be reduced by reducing the thickness T1 of the inter-layer insulating layer between the two wiring layers constituting the output lines. The same applies to a case where the output lines are each constituted by three or more layers.

As described above, the parasitic capacitance of each output line can be reduced by reducing the thickness T1 of the first inter-layer insulating layer between the upper and lower wiring (or three or more layers of wiring) constituting the output line and increasing the thickness T2 of the second inter-layer insulating layer between the output lines and the control lines formed in a layer different from the output lines.

In the present embodiment, the thickness T1 of the first inter-layer insulating layer partitioning the upper wiring and the lower wiring of each output line is smaller than the thickness T2 of the second inter-layer insulating layer partitioning the control lines and the output lines. That is, a configuration in which T1<T2 holds is employed.

According to the present embodiment having the configuration described above, the parasitic capacitance between adjacent output lines can be reduced, and thus the electric crosstalk occurring between output lines can be suppressed. For example, in the case where the output line 17-1 is configured to be used for loading from red pixels, the output line 17-2 is configured to be used for loading from green pixels, and the output line 17-3 is configured to be used for loading from blue pixels, deterioration of the loaded image by color mixture caused by crosstalk can be suppressed.

Further, according to the present embodiment, the capacitance between the output lines and the control lines can be reduced without changing the resistance of the output lines as compared with a case where the thickness T1 is equal to the thickness T2. Therefore, settlement of the control signal (for example, the reset portion driving signal), and the output signal of the pixel becomes quicker, and thus the loading speed of the pixel signal can be increased.

Second Embodiment

A photoelectric conversion apparatus according to a second embodiment will be described. To be noted, description of elements common to the first embodiment will be simplified or omitted. Regarding matter described in the first embodiment with reference to FIGS. 1 to 5 in the first embodiment, the same applies to the present embodiment.

Figure 8A:
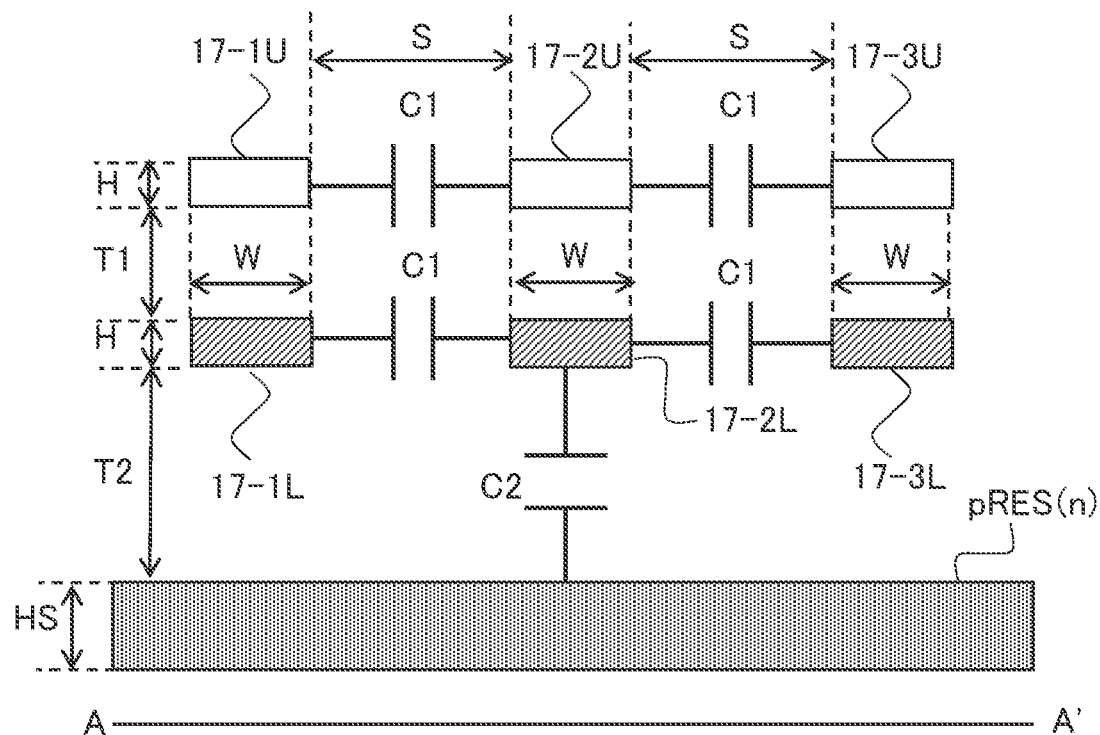
FIG. 8A is a schematic section view of a portion indicated by the line A-A' of FIG. 5 in a second embodiment.

FIG. 8A is a schematic section view of the portion indicated by the line A-A' in FIG. 5, that is, a portion where the control signal line pRES(n) that transmits the reset portion driving pulse and the output lines 17-1, 17-2, and 17-3 intersect. Description of matter common to matter described in the first embodiment with reference to FIG. 6A will be omitted.

Figure 8B:
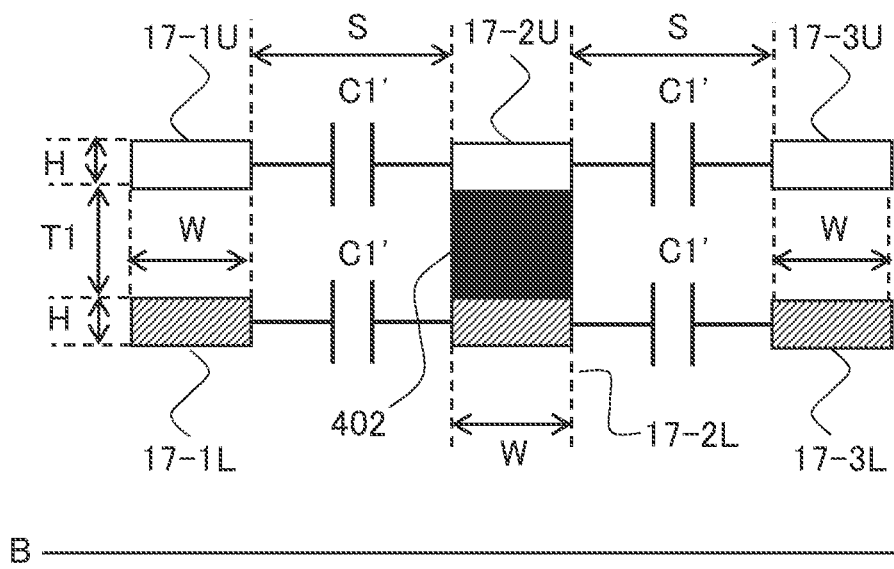
FIG. 8B is a schematic section view of a portion indicated by the line B-B' of FIG. 5 in the second embodiment.

FIG. 8B is a section view of the portion indicated by the line B-B' in FIG. 5, that is, a section view taken by cutting, in the row direction, a portion where the upper wiring 17-2U and the lower wiring 17-2L constituting the output line 17-2 are interconnected by the connecting portion 402 (connecting via). Description of matter common to matter described in the first embodiment with reference to FIG. 6B will be omitted.

Figure 9:
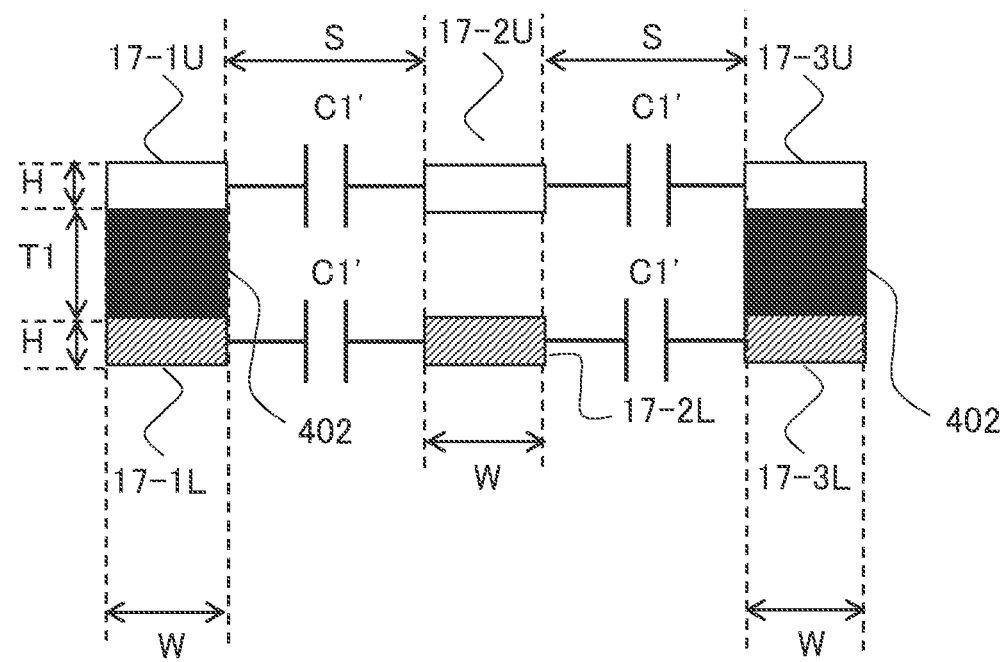
FIG. 9 is a schematic section view of a portion indicated by the line C-C' of FIG. 5 in the second embodiment.

FIG. 9 is a section view of the portion indicated by the line C-C' in FIG. 5, that is, a section view taken by cutting, in the row direction, a portion where the upper wiring and lower wiring constituting the output line 17-1 and the upper wiring and lower wiring constituting the output line 17-3 are respectively interconnected by the connecting portions 402 (via) penetrating the first inter-layer insulating layer. Description of matter common to matter described in the first embodiment with reference to FIG. 7 will be omitted.

According to the formula (1) described above, it can be seen that the parasitic capacitance C1' between the output line connected by the connecting portion 402 (connecting via) and an output line adjacent thereto in the same layer can be reduced by reducing the height (thickness) H of the output lines.

In the present embodiment, the height (thickness) H of the output lines is smaller than a height (thickness) HS of the control lines as illustrated in FIG. 8A, that is, a configuration in which H<HS holds is employed. In the illustrated example, the upper wiring (first wiring) and the lower wiring (second wiring) constituting each output line are configured to have an equal height (thickness) as a preferable embodiment, the upper wiring and lower wiring do not have to have an equal thickness. In addition, a configuration in which the relationship of H<HS is satisfied between the control lines and the upper wiring or the lower wiring may be employed. In addition, also in the case of constituting each output line by backed wiring of three or more layers, the height of all the layers of the wiring do not have to have an equal height (thickness), and a configuration in which the relationship of H<HS is satisfied between the control lines and one or more layers of the wiring may be employed.

According to the present embodiment having the configuration described above, the parasitic capacitance between adjacent output lines can be reduced, and thus the electric crosstalk occurring between output lines can be suppressed. For example, in the case where the output line 17-1 is configured to be used for loading from red pixels, the output line 17-2 is configured to be used for loading from green pixels, and the output line 17-3 is configured to be used for loading from blue pixels, deterioration of the loaded image by color mixture caused by crosstalk can be suppressed.

Third Embodiment

A photoelectric conversion apparatus according to a third embodiment will be described. To be noted, description of elements common to the first embodiment will be simplified or omitted. Regarding matter described in the first embodiment with reference to FIGS. 1 to 7, the same applies to the present embodiment.

According to the formula (1) described above, it can be seen that the parasitic capacitance C1' between the output line connected by the connecting portion 402 (connecting via) and an output line adjacent thereto in the same layer can be reduced by reducing the dielectric constant c of the inter-layer insulating layer.

In the present embodiment, a configuration in which the dielectric constant of the first inter-layer insulating layer disposed between the upper wiring (first wiring) and the lower wiring (second wiring) constituting the output lines is smaller than the dielectric constant of the second inter-layer insulating layer disposed between the output lines and the control signal lines is employed.

Figure 10:
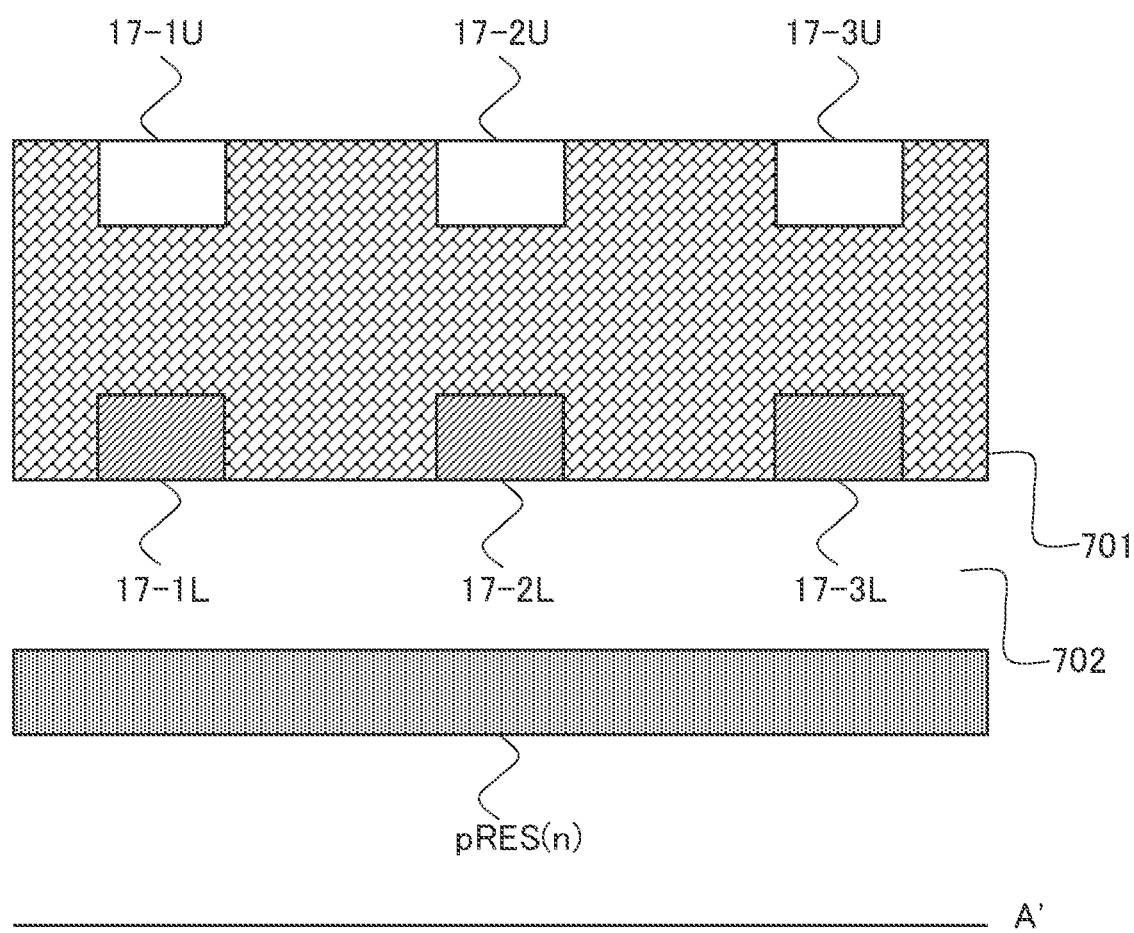
FIG. 10 is a schematic section view of a portion indicated by the line A-A' of FIG. 5 in a third embodiment.

FIG. 10 is a schematic section view of the portion indicated by the line A-A' in FIG. 5, that is, a portion where the control signal line pRES(n) that transmits the reset portion driving pulse and the output lines 17-1, 17-2, and 17-3 intersect. In the present embodiment, the dielectric constant $\varepsilon 1$ of a first inter-layer insulating layer 701 disposed between the upper wiring and the lower wiring constituting the output lines is smaller than the dielectric constant $\varepsilon 2$ of a second inter-layer insulating layer 702 disposed between the output lines and the control signal lines, that is, a configuration in which $\varepsilon 1 < \varepsilon 2$ holds is employed. Such a structure can be produced by varying the kind of material, compositions of the material, the film formation conditions, or the like between the first inter-layer insulating layer 701 and the second inter-layer insulating layer 702. Since the same signal is transmitted through the upper wiring and the lower wiring constituting the output line, the dielectric strength voltage of the first inter-layer insulating layer 701 may be small, and therefore a low dielectric constant material having a relatively small dielectric strength voltage that cannot be used between wiring having a large voltage difference can be used.

According to the present embodiment having the configuration described above, the parasitic capacitance between adjacent output lines can be reduced, and thus the electric crosstalk occurring between output lines can be suppressed. For example, in the case where the output line 17-1 is configured to be used for loading from red pixels, the output line 17-2 is configured to be used for loading from green pixels, and the output line 17-3 is configured to be used for loading from blue pixels, deterioration of the loaded image by color mixture caused by crosstalk can be suppressed.

Further, according to the present embodiment, the capacitance between the output lines and the control lines can be reduced without changing the resistance of the output lines as compared with a case where $\varepsilon 1$ is equal to $\varepsilon 2$. Therefore, settlement of the control signal (for example, the reset portion driving signal), and the output signal of the pixel becomes quicker, and thus the loading speed of the pixel signal can be increased.

Fourth Embodiment

Figure 11A:
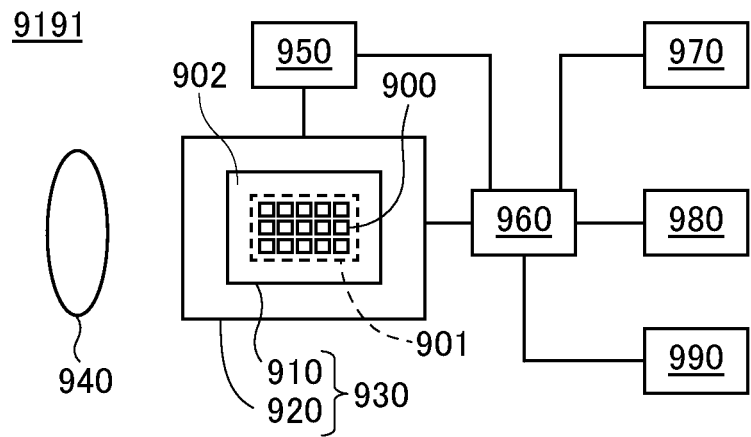
FIG. 11A is a schematic diagram for describing equipment including the photoelectric conversion apparatus according to an embodiment.

As a fourth embodiment, a system including the photoelectric conversion apparatus according to the present invention will be descried. FIG. 11A is a schematic diagram for describing equipment 9191 including a semiconductor apparatus 930. As the semiconductor apparatus 930, the photoelectric conversion apparatus of each embodiment described above can be used. The equipment 9191 including the semiconductor apparatus 930 will be described in detail.

The semiconductor apparatus 930 includes a semiconductor device 910 (photoelectric conversion apparatus) having a configuration in which a plurality of pixel output lines are provided for each column of pixels 900 provided in a light receiving portion 901 of a semiconductor substrate 902, and the plurality of pixel output lines are constituted by a plurality of wiring layers. In addition, the semiconductor apparatus 930 can also include a package 920 accommodating the semiconductor device 910 in addition to the semiconductor device 910. The package 920 can include a substrate to which the semiconductor device 910 is fixed, a lid body such as glass facing the semiconductor device 910, and the like. The package 920 can further include a bonding member such as a bonding wire or a bump that connects the semiconductor device 910 to a terminal provided in the substrate.

The equipment 9191 can include at least one of an optical apparatus 940, a control apparatus 950, a processing apparatus 960, a display apparatus 970, a storage apparatus 980, and a mechanical apparatus 990. The optical apparatus 940 corresponds to the semiconductor apparatus 930. The optical apparatus 940 is, for example, a lens, a shutter, or a mirror. The control apparatus 950 controls the semiconductor apparatus 930. The control apparatus 950 is, for example, a semiconductor apparatus such as an application-specific integrated circuit: ASIC.

The processing apparatus 960 processes a signal output from the semiconductor apparatus 930. The processing apparatus 960 is a semiconductor apparatus such as a central processing unit: CPU or an ASIC for constituting an analog front end: AFE or a digital front end: DFE. The display apparatus 970 is an electroluminescence display apparatus: FT display apparatus or a liquid crystal display apparatus that displays information (image) obtained by the semiconductor apparatus 930. The storage apparatus 980 is a magnetic device or a semiconductor device that stores the information (image) obtained by the semiconductor apparatus 930. The storage apparatus 980 is a volatile memory such as a static random-access memory: SRAM or a dynamic random-access memory: DRAM, or a nonvolatile memory such as a flash memory or a hard disk drive.

The mechanical apparatus 990 includes a movable portion or a propelling portion such as a motor or an engine. In the equipment 9191, the signal output from the semiconductor apparatus 930 is displayed on the display apparatus 970, or is transmitted to the outside by an unillustrated communication apparatus included in the equipment 9191. Therefore, the equipment 9191 preferably further includes the storage apparatus 980 and the processing apparatus 960 in addition to the storage circuit and the computational circuit that the semiconductor apparatus 930 includes. The mechanical apparatus 990 may be controlled on the basis of the signal output from the semiconductor apparatus 930.

In addition, the equipment 9191 is suitable for electronic equipment such as an information terminal (for example, a smartphone or a wearable terminal) having an image pickup function or a camera (for example, a lens-replaceable camera, a compact camera, a camcorder, or a surveillance camera). The mechanical apparatus 990 in a camera is capable of driving parts of the optical apparatus 940 for zooming, focusing, and shutter operation. Alternatively, the mechanical apparatus 990 in a camera is capable of moving the semiconductor apparatus 930 for anti-vibration operation.

In addition, the equipment 9191 can be transportation equipment such as a vehicle, a ship, or an aircraft. The mechanical apparatus 990 in the transportation equipment can be used as a moving apparatus. The equipment 9191 serving as transportation equipment is suitable for equipment that transports the semiconductor apparatus 930, and equipment that assists and/or automates driving (steering) by the image pickup function. The processing apparatus 960 for assistance and/or automation of the driving (steering) is capable of performing processing for operating the mechanical apparatus 990 serving as a moving apparatus on the basis of information obtained by the semiconductor apparatus 930. Alternatively, the equipment 9191 may be medical equipment such as an endoscope, measurement equipment such as a distance measurement sensor, analysis equipment such as an electron microscope, an office appliance such as a copier, or industrial equipment such as a robot.

According to the embodiments described above, good pixel characteristics can be obtained. Therefore, the value of the semiconductor apparatus can be improved. Improvement of the value mentioned herein can be at least one of addition of a function, improvement of the performance, improvement of the characteristics, improvement of the reliability, improvement of the production yield, reduction of the environmental load, reduction of the cost, reduction of the size, and reduction of the weight.

Therefore, by using the semiconductor apparatus 930 according to the present embodiment for the equipment 9191, the value of the equipment can be also improved. For example, by incorporating the semiconductor apparatus 930 in a transportation equipment, excellent performance can be obtained when imaging the outside or measuring the external environment of the transportation equipment. Therefore, in manufacturing and selling the transportation equipment, determining to incorporate the semiconductor apparatus according to the present embodiment in the transportation equipment is advantageous for improving the performance of the transportation equipment itself. Particularly, the semiconductor apparatus 930 is suitable for transportation equipment that performs driving assistance and/or automatic driving of the transportation equipment by using the information obtained by the semiconductor apparatus. To be noted, the implementation in a vehicle, a ship, or an aircraft is not limited to application to equipment used for the purpose of transportation, and can be also suitably performed in, for example, a drone that performs aerial photoshoot for various purposes such as inspection of a building or an agricultural facility, or monitoring natural phenomena.

In addition, the photoelectric conversion system and moving body of the present embodiment will be described with reference to FIGS. 11B and 11C.

Figure 11B:
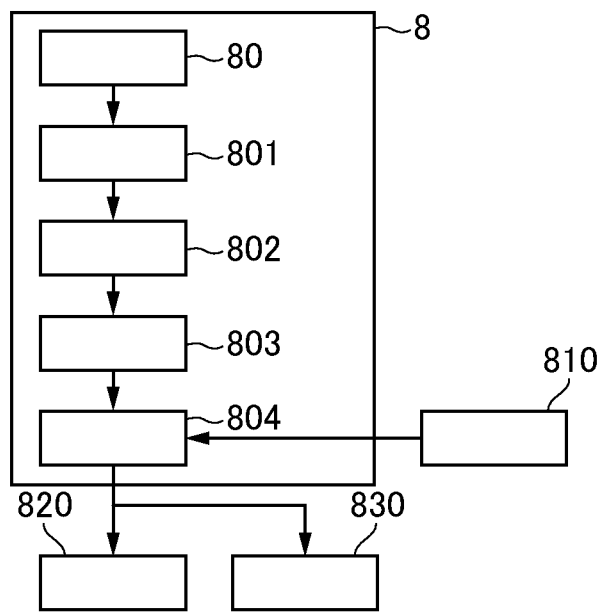
FIG. 11B is a diagram illustrating an example of a photoelectric conversion system related to an in-vehicle camera according to an embodiment.
Figure 11C:
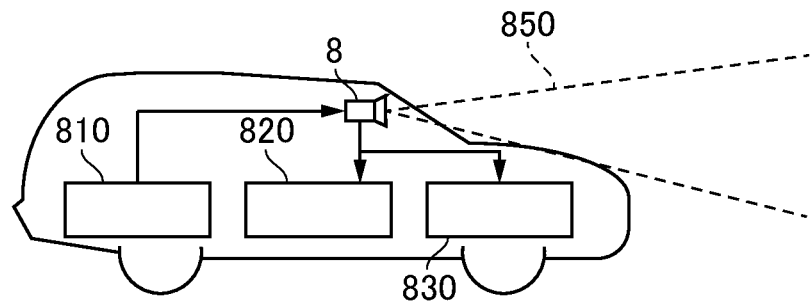
FIG. 11C is a diagram illustrating a photoelectric conversion system in the case of imaging the front side of a vehicle.

FIG. 11B illustrates an example of a photoelectric conversion system related to an in-vehicle camera. A photoelectric conversion system 8 includes a photoelectric conversion apparatus 80. The photoelectric conversion apparatus 80 is the photoelectric conversion apparatus according to any one of the embodiments described. The photoelectric conversion system 8 includes an image processing portion 801 that performs image processing on a plurality of pieces of image data obtained by the photoelectric conversion apparatus 80, and a parallax obtaining portion 802 that calculates a parallax (phase difference between parallax images) from the plurality of pieces of image data obtained from the photoelectric conversion system 8. In addition, the photoelectric conversion system 8 includes a distance obtaining portion 803 that calculates the distance to a target object on the basis of the calculated parallax, and a collision determination portion 804 that determines whether or not there is a collision possibility on the basis of the calculated distance. Here, the parallax obtaining portion 802 and the distance obtaining portion 803 are examples of distance information obtaining means that obtains distance information to the target object. That is, the distance information is information related to a parallax, a de-focusing amount, a distance to the target object, or the like. The collision determination portion 804 may determine the collision possibility by using the distance information of any of these. The distance information obtaining means may be realized by hardware designed for the exclusive purpose, or may be realized by a software module. In addition, the distance information obtaining means may be realized by a field programmable gate array: FPGA, an ASIC, or the like.

The photoelectric conversion system 8 is connected to a vehicle information obtaining apparatus 810, and is capable of obtaining vehicle information such as the vehicle speed, yaw rate, and steering angle. In addition, the photoelectric conversion system 8 is connected to a control engine control unit: control ECU 820 that is a control apparatus that outputs a control signal to generate a braking force for the vehicle on the basis of the determination result of the collision determination portion 804. In addition, the photoelectric conversion system 8 is also connected to an alarming apparatus 830 that issues an alarm to the driver on the basis of the determination result of the collision determination portion 804. For example, in the case where the collision possibility is high according to the determination result of the collision determination portion 804, the control ECU 820 performs vehicle control for avoiding the collision or reducing the damage by, for example, braking, cancelling acceleration, or suppressing the engine output. The alarming apparatus 830 warns the user by, for example, issuing an alarm such as a sound, displaying alarm information on a screen of a car navigation system or the like, or applying vibration to the seat belt or the steering.

In the present embodiment, the surroundings of the vehicle, for example, the front side or the rear side of the vehicle is imaged by the photoelectric conversion system 8. FIG. 11C illustrates the photoelectric conversion system in the case of imaging the front side of the vehicle (imaging region 850). The vehicle information obtaining apparatus 810 gives an instruction to the photoelectric conversion system 8 or the photoelectric conversion apparatus 80. According to such a configuration, the precision of the distance measurement can be improved more.

Although an example of performing control to avoid collision with another vehicle has been described above, the present invention is also applicable to control for automated driving to follow another vehicle, control for automated driving to drive within a lane, and the like. Further, the photoelectric conversion system is applicable to not only a vehicle such as an automobile, but also moving bodies (moving apparatuses) such as ships, airplanes, and industrial robots. In addition, the photoelectric conversion system can be widely applied to not only moving bodies but also equipment that utilizes object recognition such as intelligent transport systems: ITS.

Modification of Embodiments

To be noted, the present invention is not limited to the embodiments and examples described above, and can be modified in many ways within the technical concept of the present invention. For example, different embodiments described above may be implemented in combination. That is, arbitrarily selected two or three of the setting of thickness of the inter-layer insulating layers of the first embodiment, the setting of the thickness of the wiring layers of the second embodiment, and the setting of the dielectric constants of the inter-layer insulating layers of the third embodiment can be implemented in combination.

In addition, the photoelectric conversion apparatus to which the present invention is applicable is not limited to a specific embodiment, and for example, the light receiving portion may be of a front side illumination type or a back side illumination type. In addition, the photoelectric conversion apparatus may be a photoelectric conversion apparatus of a lamination type in which a semiconductor chip including a light receiving portion and a semiconductor chip including a logic portion are laminated. The image signal output from the photoelectric conversion apparatus may be an analog signal or a digital signal.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-108802, filed Jul. 6, 2022, which is hereby incorporated by reference herein in its entirety.

What is claimed is:

1. A photoelectric conversion apparatus comprising:
a semiconductor layer in which pixels are arranged in a matrix, the pixels each including a photoelectric conversion portion and a transistor used for loading a signal from the photoelectric conversion portion; and
multilayer wiring formed on the semiconductor layer and including a first wiring layer, a first inter-layer insulating layer, a second wiring layer, a second inter-layer insulating layer, and a third wiring layer in this order,
wherein the multilayer wiring includes a plurality of output lines for loading signals from the pixels,
the pixels are each connected to corresponding one of the plurality of output lines,
each column of the matrix of the pixels is provided with two or more of the plurality of output lines,
the output lines each include first wiring provided in the first wiring layer, second wiring provided in the second wiring layer, and a connecting portion penetrating the first inter-layer insulating layer to interconnect the first wiring and the second wiring, and
a thickness of the first inter-layer insulating layer is smaller than a thickness of the second inter-layer insulating layer.

2. The photoelectric conversion apparatus according to claim 1, wherein a dielectric constant of the first inter-layer insulating layer is smaller than a dielectric constant of the second inter-layer insulating layer.

3. The photoelectric conversion apparatus according to claim 1, wherein the first wiring and the second wiring at least partially overlap with each other as viewed through in a direction orthogonal to a main surface of the semiconductor layer.

4. The photoelectric conversion apparatus according to claim 3,
wherein the first wiring and the second wiring have substantially equal widths, and
an outer edge of the first wiring and an outer edge of the second wiring substantially overlap with each other as viewed through in the direction orthogonal to the main surface of the semiconductor layer.

5. The photoelectric conversion apparatus according to claim 3, wherein the connecting portion is disposed at a portion where the first wiring and the second wiring overlap with each other as viewed through in the direction orthogonal to the main surface of the semiconductor layer.

6. The photoelectric conversion apparatus according to claim 1, wherein a plurality of connecting portions each serving as the connecting portion are provided at a predetermined pitch in a direction of columns of the pixels.

7. A system comprising:
the photoelectric conversion apparatus according to claim 1; and
a processing apparatus configured to process image data output from the photoelectric conversion apparatus.

8. The photoelectric conversion apparatus according to claim 1,
wherein the multilayer wiring includes a plurality of control lines for driving the transistors of the pixels,
the transistor of each of the pixels is connected to corresponding one of the plurality of control lines, and
each row of the matrix of the pixels is provided with one or more of the plurality of control lines, and
the control lines are provided in the third wiring layer.

9. A photoelectric conversion apparatus comprising:
a semiconductor layer in which pixels are arranged in a matrix, the pixels each including a photoelectric conversion portion and a transistor used for loading a signal from the photoelectric conversion portion; and
multilayer wiring formed on the semiconductor layer and including a first wiring layer, a first inter-layer insulating layer, a second wiring layer, a second inter-layer insulating layer, and a third wiring layer in this order,
wherein the multilayer wiring includes a plurality of output lines for loading signals from the pixels and a plurality of control lines for driving the transistors of the pixels,
the pixels are each connected to corresponding one of the plurality of output lines,
each column of the matrix of the pixels is provided with two or more of the plurality of output lines,
each row of the matrix of the pixels is provided with one or more of the plurality of control lines,
the output lines each include first wiring provided in the first wiring layer, second wiring provided in the second wiring layer, and a connecting portion penetrating the first inter-layer insulating layer to interconnect the first wiring and the second wiring, and
a thickness of the first wiring and/or a thickness of the second wiring is smaller than a thickness of the control lines.

10. The photoelectric conversion apparatus according to claim 9, wherein a thickness of the first inter-layer insulating layer is smaller than a thickness of the second inter-layer insulating layer.

11. The photoelectric conversion apparatus according to claim 9, wherein the control lines are provided in the third wiring layer.

12. A photoelectric conversion apparatus comprising:
a semiconductor layer in which pixels are arranged in a matrix, the pixels each including a photoelectric conversion portion and a transistor used for loading a signal from the photoelectric conversion portion; and multilayer wiring formed on the semiconductor layer and including a first wiring layer, a first inter-layer insulating layer, a second wiring layer, a second inter-layer insulating layer, and a third wiring layer in this order, wherein the multilayer wiring includes a plurality of output lines for loading signals from the pixels, the pixels are each connected to corresponding one of the plurality of output lines, each column of the matrix of the pixels is provided with two or more of the plurality of output lines, the output lines each include first wiring provided in the first wiring layer, second wiring provided in the second wiring layer, and a connecting portion penetrating the first inter-layer insulating layer to interconnect the first wiring and the second wiring, and a dielectric constant of the first inter-layer insulating layer is smaller than a dielectric constant of the second inter-layer insulating layer.

13. The photoelectric conversion apparatus according to claim 12, wherein the multilayer wiring includes a control line, and a thickness of the first wiring and/or a thickness of the second wiring is smaller than a thickness of the control line.

14. The photoelectric conversion apparatus according to claim 12, wherein the multilayer wiring includes a plurality of control lines for driving the transistors of the pixels, the transistor of each of the pixels is connected to corresponding one of the plurality of control lines, and each row of the matrix of the pixels is provided with one or more of the plurality of control lines, and the control lines are provided in the third wiring layer.

* * * * *